Oct. 2, 1951 — H. W. DIETERT ET AL — 2,569,749
MOISTURE TELLER
Filed Nov. 3, 1947 — 3 Sheets-Sheet 1

INVENTOR.
HARRY W. DIETERT
RALPH E. STEINMUELLER
BY
Whittemore, Hulbert
& Belknap
ATTORNEYS Oct. 2, 1951  H. W. DIETERT ET AL  2,569,749
MOISTURE TELLER
Filed Nov. 3, 1947  3 Sheets-Sheet 2
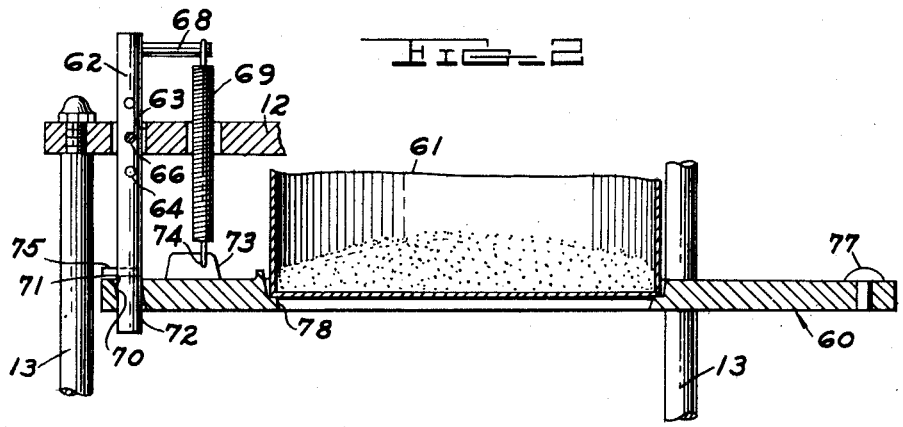
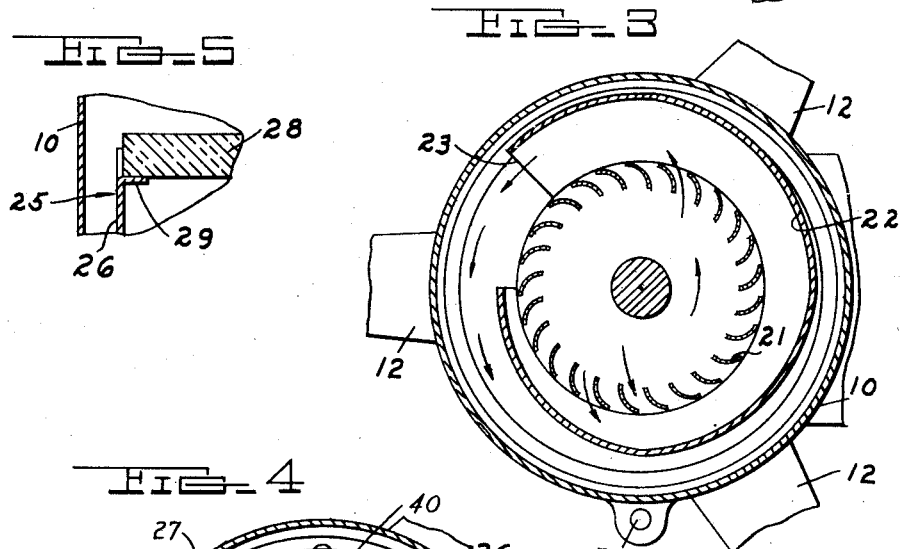
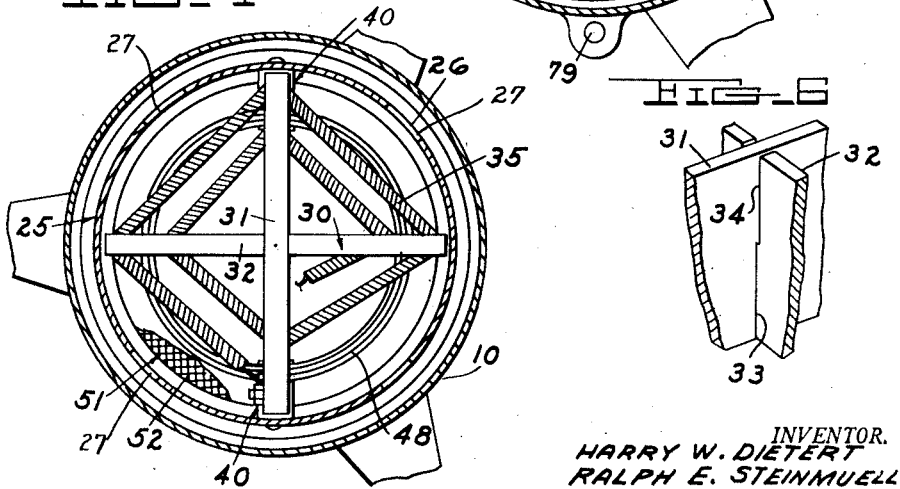
INVENTOR.
HARRY W. DIETERT
RALPH E. STEINMUELLER
BY
Whittemore, Hulbert
& Belknap ATTORNEYS Oct. 2, 1951     H. W. DIETERT ET AL     2,569,749
MOISTURE TELLER
Filed Nov. 3, 1947     3 Sheets-Sheet 3
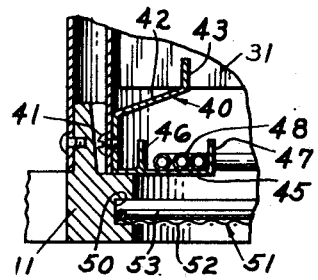
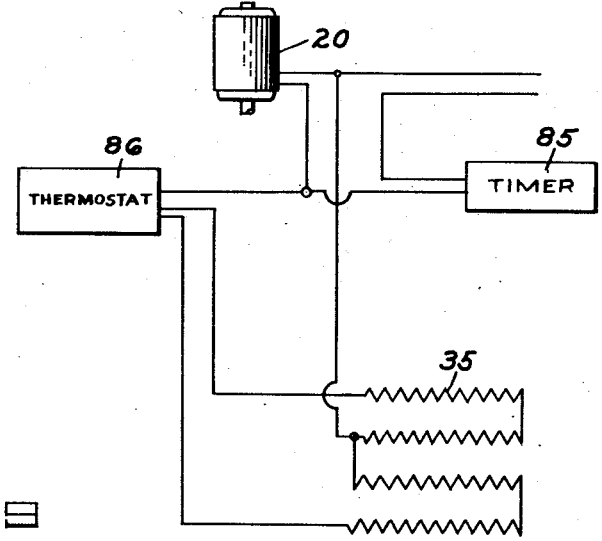
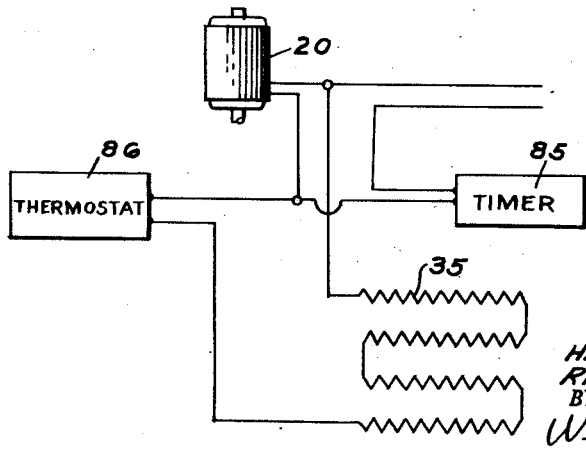
INVENTOR.
HARRY W. DIETERT
RALPH E. STEINMUELLER
BY
Whittemore, Hulbert
& Belknap
ATTORNEYS Patented Oct. 2, 1951

2,569,749

UNITED STATES PATENT OFFICE 2,569,749

MOISTURE TELLER

Harry W. Dietert and Ralph E. Steinmueller, Detroit Mich., assignors to Harry W. Dietert Company, Detroit Mich., a corporation of Michigan Application November 3, 1947, Serial No. 783,766

13 Claims. (Cl. 34—44)

1

The present invention relates to a moisture teller and more particularly to a device effective to treat a specimen or sample so as to remove moisture therefrom, after which the weight of the sample is compared with its weight before treatment to determine the weight of moisture which has been removed.

According to the present invention, the apparatus comprises a casing having an electric motor-driven blower therein for circulating air therethrough. Means are provided for supporting air-pervious pans which contain material to be treated. Intermediate the pan support and the blower, apparatus is provided for heating the circulated air to a predetermined temperature. At the same time, the construction is designed to provide for a cooling flow of air between the outer casing of the device and the air heating chamber. The pan support is adjustable so that pans of different size may be employed with the device.

With the foregoing general description in mind, it is an object of the present invention to provide a moisture teller characterized by the provision therein of a cooling flow of air adjacent the outer wall of the device to keep the outer wall relatively cool.

It is a further object of the present invention to provide a moisture teller including pan supporting means movable to permit removal and replacement of sample pans and adjustable to accommodate sample pans of different sizes.

More specifically, it is a feature of the present invention to provide a moisture teller comprising an elongated vertical housing provided adjacent its upper end with motor-driven air circulating means, an air heating chamber intermediate the ends of the casing and spaced inwardly from the walls thereof, and means adjacent the lower end of the casing for supporting an air-pervious sample pan.

It is a further feature of the present invention to provide a moisture teller comprising a main casing, a fan housing adjacent the upper end of the main housing and spaced inwardly from the walls thereof, an air heating chamber spaced inwardly from the walls of the main casing so as to provide for a cooling circulation of air intermediate the air heating chamber and the walls of the main casing, and means adjacent the lower end of the casing for supporting an air-pervious sample pan.

It is a further feature of the present invention to provide a moisture teller comprising a vertically extending main casing, a volute fan housing adjacent the upper end of the casing

2 adapted to provide a rotary circulation of air providing a velocity head, an air heating chamber within the casing having openings therethrough for admitting air, and means adjacent the lower end of the casing for supporting an air-pervious sample pan.

Other objects and features of the invention will become apparent as the description proceeds, especially when taken in conjunction with the accompanying drawings, wherein:

Figure 2 is a fragmentary vertical section illustrating the support for the sample pans;

Figure 3 is a horizontal section through the blower or fan;

Figure 4 is a horizontal section through the moisture teller taken at the level of the air heating chamber;

Figure 5 is a fragmentary vertical section illustrating the support of the insulator plate at the top of the air heating chamber;

Figure 6 is a fragmentary perspective illustrating the assembly of the elements comprising the cross frame for supporting the air heating elements in the air heating chamber;

Figure 7 is a fragmentary vertical section through Figure 4 illustrating the supporting of the temperature responsive means; and Figures 8 and 9 are diagrammatic wiring diagrams.

Figure 1:
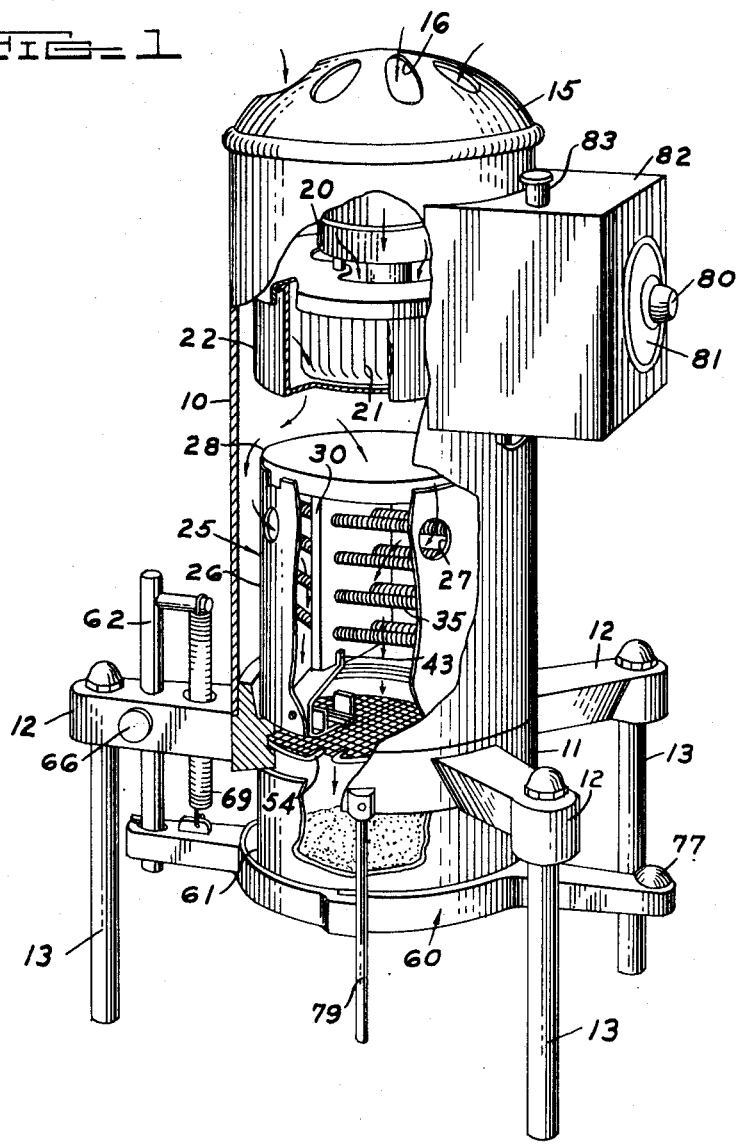
Figure 1 is a perspective of the improved moisture teller, with parts broken away.

Referring now to the figures, the moisture teller comprises a generally cylindrical casing 10 supported by an upper frame element 11 provided with a plurality of radially extending supports 12, each of which has at its outer end a supporting leg 13. A removable cover 15 is provided having a plurality of air inlets 16.

Adjacent the upper end of the casing, means are provided for effecting a downward circulation of air therethrough and these means comprise an electric motor 20, the shaft of which is connected to a centrifugal impeller 21 best illustrated in Figure 3. The impeller 21 is located within a volute housing 22 provided with an outlet 23. An air inlet into the interior of the volute housing is provided around the motor drive shaft through which air is emitted into and adjacent the eye of the impeller. Rotation of the impeller 21 imparts rotation to the air within the housing 22 and this air escapes through the opening 23 at a substantial velocity. As a result of this arrangement the air escaping from the opening 23 has a velocity head.

Beneath the blower housing 22 is an air heating chamber 25 comprising a cylindrical shell or wall 26 provided with air inlet openings 27 adjacent the upper end thereof and closed at its top by an insulator disk 28, the disk preferably being formed of ceramic material. As best seen in Figure 5, the disk 28 is preferably supported from inwardly turned lugs 29 at the upper end of the cylindrical shell 26. Located within the heating chamber 25 is a cross frame 30 preferably formed of ceramic material and including a pair of flat plates 31 and 32 interlocked as illustrated n Figure 6. Each of the plates 31 and 32 is provided with notches 33 and 34, respectively, by means of which the two plates are fitted together in the form of a cross. The frame indicated generally at 30 forms means for supporting electric resistance heating elements 35 and these elements are arranged to pass through openings formed in the cross frame 30 and to extend between adjacent arm portions of the cross, as well illustrated in Figure 4. The heating elements 35 may be arranged in a series circuit or in two parallel circuits, depending upon the voltage available.

As best seen in Figures 1 and 7, the means for supporting the frame 30 and the heating elements 35 comprise brackets 40 secured to the cylindrical wall of the housing by suitable fastening elements such as the screws 41. The brackets 40 have upwardly and inwardly extending portions 42 terminating in an upwardly extending bifurcated end which provides spaced fingers 43. As best seen in Figure 1, the fingers 43 are adapted to straddle the legs of the cross frame 30 and to support it in operative position. Brackets 40 further are provided with inwardly extending arms 45 having upwardly extending fingers 46 and 47 to provide means for supporting and locating temperature responsive means 48. The lower end of the heating chamber 25 is open to permit downward escape of heated air therefrom.

The frame element 11, as best seen in Figure 7, is provided with an annular recessed groove 50 in which is supported a fire screen 51 comprising a circular screen 52 secured to a wire frame 53. The wire frame, as best seen in Figure 1, has inwardly turned spaced end portions 54, thus permitting insertion of the fire screen in the groove 50 by pressing the inwardly turned ends 54 of the frame together.

A pan supporting frame 60 is provided adjacent the lower end of the casing 10 for supporting sample pans 61. The sample pans 61 may be of different sizes, as for example one inch or two inches in height, and accordingly it is desirable to provide for a corresponding adjustment of the pan supporting frame 60. For this purpose the frame 60 is carried by a vertically adjustable post 62 which passes through an opening 63 formed in one of the arms 12 of the frame 11, all as best seen in Figure 2. The post 62 is provided with a plurality of openings 64 therethrough and the arm 12 has an opening therethrough for the reception of a pin 66. As will be evident, the pan 62 may be vertically adjusted in predetermined steps by removing the pin 66 and moving the post 62 vertically until the desired one of the several opening 64 is brought into registry with the opening for the pin 66. Adjacent its upper end the post 62 has a radially extending spring supporting arm 68 on which is mounted a tension spring 69.

The pan supporting frame 60 is provided with an opening 70 for receiving the lower end of the post 62. The opening 70 has inclined portions 71 and 72 which permit a limited rocking movement of the frame 60 about the post 62. The frame 60 has an upwardly extending ear 73 apertured to receive the lower end of the spring 69 as indicated at 74. Adjacent the lower end of the post 62 is a pin 75. The spring 69 therefore urges the frame 60 upwardly, keeping its left-hand end, as seen in Figure 2, against the abutment pin 75 and also preventing downward rocking movement of the frame about a pivot axis established generally by the opening 70 and the lower portion of the post 62. At the opposite end of the frame 60 is provided a button 77 by means of which the operator may depress the right-hand end of the frame 60 as seen in this figure, thereby causing the frame to swing about the pivot referred to. This permits ready removal and replacement of the sample pan 61. It will be observed that the central portion of the frame 60 is open as indicated at 78 to permit downward escape of air after it has passed through the air-pervious bottom of the pan 61. For this purpose the sample pans 61 are provided with air-pervious bottoms, such for example as screening of suitable mesh.

As best seen in Figure 1, guide means are provided for guiding the pan supporting frame 60 in its rocking movement about its supporting pivot. This means takes the form of depending rods 79 supported at their upper ends by suitably apertured bosses formed on the upper frame member 11. The rods 79 therefore insure proper registry between the upper edge of the sample pan 61 and the lower surface of the central annular portion of the frame 11.

Automatic means are provided for carrying out the cycle of the apparatus. This means takes the form of a thermostatic control for the resistance heating elements 35, the control including the temperature responsive tube 48 previously referred to. In addition, a timer is provided including a timer setting button 80 and a dial 81 carried at the outside of a box 82 which receives the timing and thermostatic control mechanism. The box 82 is also provided with an adjusting knob 83 by means of which the temperature control mechanism may be set to maintain the desired temperature of air as it escapes from the heating chamber 25.

Referring now to Figures 8 and 9, there are illustrated two different circuit arrangements depending upon the voltage available. In both figures the fan motor 20 is illustrated as connected across the power leads in series with the mechanical timer 85, while the heating elements 35 are connected across the power leads in series with both the thermostatic control means indicated diagrammatically at 86 and the mechanical timer 85. However, in Figure 8 the heating elements 35 are shown as comprising four elements arranged in pairs connected in series, the pairs being connected in parallel. On the other hand, in Figure 9 the heating elements 35 are all illustrated as connected in series. Accordingly, the wiring diagram illustrated in Figure 9 is intended for use on a power circuit having double voltage of that for which the wiring circuit of Figure 8 is intended. By way of example, the wiring circuit of Figure 8 may be suitable for 110 volts and the wiring circuit of Figure 9 would therefore be suitable for use with 220 volts.

In operation, the material whose moisture content is to be analyzed is placed in a sample pan 61. The pan supporting frame 60 is adjusted to the proper height for accommodating a particular pan selected by vertical adjustment of the supporting post 62 if such is necessary. The thermostatic control mechanism is set by means of the knob 83 to maintain the desired temperature of air and the timer is set by manipulation of the button 80 to pre-set the desired time cycle. At this time attention is directed to the fact that as a result of the wiring circuits illustrated diagrammatically in Figures 8 and 9 the fan or blower motor 20 is constantly energized throughout the cycle whereas current flow to the heating elements 35 is under the joint control of the thermostat 86 and the timer 85. In other words, during the predetermined time cycle there will be a constant flow of air through the moisture teller but current to the heating elements 35 will be cut off and on as necessary to maintain the predetermined temperature. Accurate control of temperature and the time cycle are both essential, inasmuch as the moisture teller may be used for inorganic materials which might decompose if subjected to too high a temperature or to an elevated temperature for too long a period.

When the circuit is closed the device operates automatically to circulate air of a predetermined temperature through the material in the sample pan for a predetermined interval. When the cycle is completed the operator depresses the button 77 and removes the sample pan 61, after which the pan and its contents are weighed and the weight compared with the weight of the pan and contents prior to treatment.

By virtue of the employment of a centrifugal blower and by the particular arrangement of the air heating chamber within the main casing the outside of the casing in maintained cool. Air discharged at substantial velocity from the opening 23 in the volute fan or blower chamber circulates around the inner wall of the casing 10 and intermediate this wall and the outer wall 26 of the air heating chamber 25. Air inlet openings 27 adjacent the upper end of the heating chamber 25 admit air thereinto which thereafter moves downwardly over the heating elements 35 and passes through the fire screen 51 and thence outwardly through the sample pan 61 and its contents. The circulation of air around the outer wall of the air heating chamber 25 minimizes the transfer of heat from the heating chamber to the wall 10 of the casing.

Provision of the supporting frame 11 with its radially extending arms 12 affords access to the pan 61 and further minimizes transfer of heat to the support on which the moisture teller rests.

The drawings and the foregoing specification constitute a description of the improved moisture teller in such full, clear, concise and exact terms as to enable any person skilled in the art to practice the invention, the scope of which is indicated by the appended claims.

What we claim as our invention is:

1. A moisture teller comprising a vertical casing, an air-pervious specimen pan at the lower end of said casing, means adjacent the upper end of said casing for circulating air downwardly through said casing, an air heating chamber in said casing, and heating elements in said chamber, said chamber being spaced inwardly from the side walls of said casing to provide an air-insulation space therebetween, said chamber being closed at its upper end and having air inlet openings at its sides to provide for flow of cool air in the space between said casing and said chamber.

2. A moisture teller comprising a vertical casing, an air-pervious specimen pan at the lower end of said casing, an air heating chamber spaced inwardly from the walls of said casing, said chamber being open at its bottom end to discharge heated air through said pan, the upper end of said chamber being closed, the sides of said chamber having air inlet openings, and means in said casing above said chamber for imparting a rotary flow of air in the annular space between said casing and chamber.

3. A moisture teller comprising a vertical casing, an air-pervious specimen pan at the lower end of said casing, an air heating chamber spaced inwardly from the walls of said casing above said pan, said chamber being open at its bottom end to discharge heated air through said pan, the upper end of said chamber being closed, the sides of said chamber having air inlet openings, and means in said casing above said chamber for imparting a rotary flow of air in the annular space between said casing and chamber, said means comprising an impeller having a volute housing.

4. A moisture teller comprising a vertical casing having air inlet openings at its top and an open bottom, a supporting arm extending laterally of said casing, a post vertically adjustable with respect to said arm, a pan holder pivoted to said post, and a spring urging said holder upwardly to hold a pan carried thereby against the bottom of said casing.

5. A moisture teller comprising a vertical casing having air inlet openings at its top and an open bottom, a supporting arm extending laterally of said casing, a post vertically adjustable with respect to said arm, a pan holder pivoted to said post, a spring urging said holder upwardly to hold a pan carried thereby against the bottom of said casing, and means for retaining said post in a plurality of different positions of adjustment corresponding to specimen pans of different heights.

6. A moisture teller comprising a vertical casing having air inlet openings at its top and an open bottom, a supporting arm extending laterally of said casing, a post vertically adjustable with respect to said arm, a pan holder pivoted to said post, a spring urging said holder upwardly to hold a pan carried thereby against the bottom of said casing, and an operating arm extending forwardly from said holder to provide manually operable means for swinging said holder downwardly to remove or replace said pan.

7. In a moisture teller, a casing, an air heating chamber in said casing, said chamber being closed at the top, open at the bottom and having lateral air inlet openings, a plurality of brackets carried adjacent the bottom of said chamber, said brackets comprising inwardly and upwardly extending arms terminating in ends having spaced lugs thereon, crossing panels supported by said arms and held against shifting by said lugs, heating elements extending between adjacent sections of said panels, said brackets having inwardly extending portions provided with spaced vertical flanges, temperature responsive means disposed about the lower edge of said chamber on said portions between said flanges, and means for supporting an air-pervious specimen pan against the lower end of said chamber.

8. A moisture teller comprising a vertical cylindrical casing having its lower end open; an air heating chamber in said casing having its lower end open, its side walls spaced inwardly from the side walls of said casing, and means closing the upper end of said chamber; means intermediate the open lower ends of said casing and chamber closing the space therebetween, air heating means in said chamber, air inlet ports in the side wall of said chamber adjacent the top thereof, means below the open lower end of said chamber for supporting an air-pervious specimen pan against the lower end of said chamber, and a blower in said casing above said chamber for directing air downwardly into the space between said casing and chamber and thence through said chamber and out the lower end thereof.

9. A moisture teller comprising a vertical cylindrical casing having its lower end open; an air heating chamber in said casing having its lower end open, its side walls spaced inwardly from the side walls of said casing, and means closing the upper end of said chamber; means intermediate the open lower ends of said casing and chamber closing the space therebetween, air heating means in said chamber, air inlet ports in the side wall of said chamber adjacent the top thereof, means below the open lower end of said chamber for supporting an air-pervious specimen pan against the lower end of said chamber, a blower in said casing above said chamber for directing air downwardly into the space between said casing and chamber and thence through said chamber and out the lower end thereof, and a thermostat adjacent the lower end of said chamber for controlling said heating means.

10. A moisture teller comprising a vertical cylindrical casing having its lower end open; an air heating chamber in said casing having its lower end open, its side walls spaced inwardly from the side walls of said casing, and means closing the upper end of said chamber; means intermediate the open lower ends of said casing and chamber closing the space therebetween, air heating means in said chamber, air inlet ports in the side wall of said chamber adjacent the top thereof, means below the open lower end of said chamber for supporting an air-pervious specimen pan against the lower end of said chamber, a blower in said casing above said chamber for directing air downwardly into the space between said casing and chamber and thence through said chamber and out the lower end thereof, a thermostat adjacent the lower end of said chamber for controlling said heating means, and a timer for controlling the blower and terminating operation of said heating means.

11. A moisture teller comprising a vertical cylindrical casing having its lower end open; an air heating chamber in said casing having its lower end open, its side walls spaced inwardly from the side walls of said casing, and means closing the upper end of said chamber; means intermediate the open lower ends of said casing and chamber closing the space therebetween, air heating means in said chamber, air inlet ports in the side wall of said chamber adjacent the top thereof, means below the open lower end of said chamber for supporting an air-pervious specimen pan against the lower end of said chamber, and a blower in said casing above said chamber for directing air downwardly into the space between said casing and chamber and thence through said chamber and out the lower end thereof, said last means comprising a centrifugal blower effective to establish a circular flow of air around the annular space between said casing and chamber at a pressure above atmospheric, whereby air flows into said chamber through said ports.

12. A moisture teller comprising a cylindrical air heating chamber closed at its top and open at its bottom, support means beneath said chamber for supporting an air-pervious specimen pan, a casing surrounding the sides and upper end of said chamber and providing an annular space around the sides thereof, annular means extending between the bottom of said chamber and said casing and closing the bottom of said annular space, air inlet ports in the sides of said chamber adjacent the closed upper end thereof, heating elements in said chamber, a blower in said casing above the closed upper end of said chamber, and a specimen pan on said support means, said pan having an air-pervious bottom wall and a side wall forming an air conduit from the open bottom end of said chamber to the bottom wall of said pan.

13. A moisture teller comprising a cylindrical air heating chamber closed at its top and open at its bottom, means at the bottom end of said chamber for supporting an air-pervious specimen pan, a casing surrounding the sides and upper closed end of said chamber and providing an annular space around the sides thereof, annular means closing the lower end of said space, air inlet ports in the sides of said chamber adjacent the closed upper end thereof, heating elements in said chamber, and a centrifugal blower in said casing above the closed upper end of said chamber effective to establish a rotary circulation of air in the annular space between the sides of said chamber and casing at an elevated pressure to cause air to flow into the ports of said chamber.

HARRY W. DIETERT.
RALPH E. STEINMUELLER.

REFERENCES CITED

The following references are of record in the file of this patent:

UNITED STATES PATENTS

| Number | Name | Date |
| --- | --- | --- |
| 1,455,034 | Small | May 15, 1923 |
| 1,750,094 | Emmrich | Mar. 11, 1930 |
| 1,871,345 | Rigante | Aug. 9, 1932 |
| 1,886,286 | Martin | Nov. 1, 1932 |
| 1,961,772 | Martin | June 5, 1934 |
| 2,004,488 | Kelley | June 11, 1935 |
| 2,080,168 | Dietert | May 11, 1937 |
| 2,098,853 | Billingsley | Nov. 9, 1937 |
| 2,113,770 | Richardson | Apr. 12, 1938 |
| 2,153,239 | Curci | Apr. 4, 1939 |
| 2,197,178 | Gates | Apr. 16, 1940 |
| 2,257,394 | Niersbach | Sept. 30, 1941 |
| 2,395,632 | Litty, Jr. | Feb. 26, 1946 |
| 2,480,227 | Derr | Aug. 30, 1949 |

FOREIGN PATENTS

| Number | Country | Date |
| --- | --- | --- |
| 172,480 | Great Britain | Dec. 15, 1921 |